73-659 SR

1/15/80 XR 4,184,205

United States Patent [19]

Morrow

[11] 4,184,205

[45] Jan. 15, 1980

[54] DATA ACQUISITION SYSTEM

[75] Inventor: Robert S. Morrow, Columbus, Ohio

[73] Assignee: IRD Mechanalysis, Inc., Columbus, Ohio

[21] Appl. No.: 854,939

[22] Filed: Nov. 25, 1977

[51] Int. Cl.[2] .............. G06F 15/34

[52] U.S. Cl. .............. 364/508; 73/577; 73/659; 340/683; 364/550

[58] Field of Search .............. 364/508, 554, 550, 551; 340/683, 679; 73/570, 577, 579, 600, 602, 658, 659, 67.3; 235/302.2, 304

[56] References Cited

U.S. PATENT DOCUMENTS

| | | | |
|---|---|---|---|
| 3,144,774 | 8/1964 | Bjorn | 340/683 |
| 3,699,806 | 10/1972 | Weichbrodt | 73/659 |
| 3,731,526 | 5/1973 | Games | 364/508 |
| 3,758,758 | 9/1973 | Games et al. | 364/508 |
| 3,763,397 | 10/1973 | Yockers | 340/679 |
| 3,783,680 | 1/1974 | Mason | 340/683 |
| 3,787,670 | 1/1974 | Nelson et al. | 235/302.2 |
| 4,004,464 | 1/1977 | Himmler | 364/508 |
| 4,010,637 | 3/1977 | Harwell et al. | 364/508 |

OTHER PUBLICATIONS

"Predictive Maintenance Vibration Monitor," Patent Associated Literature, Research Disclosure No. 139, p. 4, Nov. 1975.

Kaufman, "Measure Machinery Vibration–It Can Help You Anticipate and Prevent Failures," Instruments & Control Systems, Feb. 1975, pp. 59–62.

Hambley, "Early Warning System Can Cut Costly Vibration Damage," Process Engng. Plant & Contr, May 1971, pp. 55–57.

Javid et al., Analysis, Transmission, and Filtering of Signals, McGraw–Hill Book Co., 1963, p. 180.

*Primary Examiner*—Errol A. Krass
*Attorney, Agent, or Firm*—Thomas H. Murray

[57] ABSTRACT

A data acquisition system utilizing a microcomputer and incorporating a plurality of monitors each adapted to produce an electrical signal indicative of a physical condition of apparatus to be monitored. The electrical signals are fed via multiplexing equipment and analog-to-digital converters into the microcomputer which is equipped with print-out means. The system is such that the level of any one or all of the signals from the respective monitors can be printed out as well as a change in the condition of any signal. Means are incorporated into the computer for calculating and printing the trend (i.e., the slope of a plot of signal amplitude versus time) of a succession of stored signals from any monitor which would indicate a probable malfunction of a device being monitored and the probable time to failure. In the case where the signals from the monitors comprise vibration signals, the system performs an automatic frequency spectrum analysis whenever a probable or actual malfunction is detected.

20 Claims, 6 Drawing Figures

DATA ACQUISITION SYSTEM

Figure 1A:
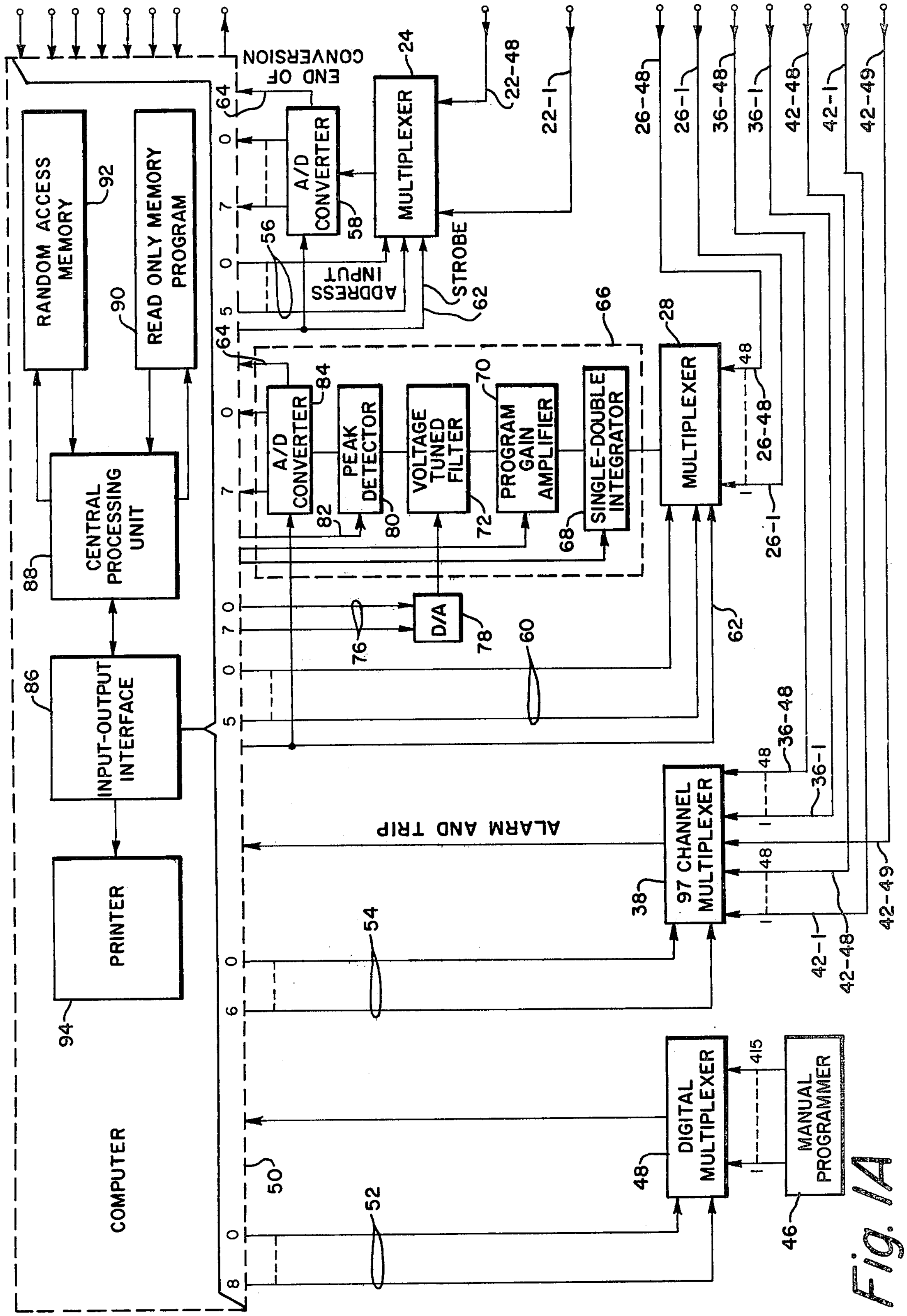

While not limited thereto, the present invention is particularly adapted for use in monitoring vibrations produced by rotating or other types of machinery in a complete industrial installation, such as a refinery. By monitoring vibrations in this manner, malfunctions and probable future failures of any machines within the industrial installation can be readily ascertained; and corrective action can be taken immediately and before a breakdown or possible dangerous condition occurs.

There are at present essentially two types of data acquisition systems—the dedicated minicomputer system and the simple data logger. Computer systems generally include disc memory for data storage, CRT terminals for display of data and line printers for hard copy of data. As a result, they require a relatively large capital investment. While simple data loggers are relatively inexpensive, they offer simple functions only such as logging data and comparing the data to setpoints.

SUMMARY OF THE INVENTION

In accordance with the present invention, a data acquisition system is provided which does not require a large capital investment but which, nevertheless, is capable of printing out complete system information including a malfunction of any one of a number of different devices being monitored, the time to failure of any piece of equipment being monitored, and an analysis of the input information. In the case where the invention is used in a vibration monitoring system, it performs the functions of automatic channel data logging, frequency spectrum analysis, and vibration level trend prediction. Each of these functions additionally may be manually selected for each individual monitor or channel via front panel controls. A built-in system fault detection circuit is used which will respond to either an internal or circuit fault or to an external system alarm relay closure. Data readout is obtained via a self-contained dot-matrix printer assembly.

All functions of the data acquisition system of the invention are under the control of an internal microcomputer which continuously samples data from a plurality of monitors. At each monitor, vibration input signals are obtained directly from velocity pickups, self-amplified accelerometers, noncontact signal sensors or from accelerometer preamps. In addition, direct current signals proportional to vibration level or amplitude and trip alarm signals are obtained from the monitors, these latter signals being derived by comparision of the actual vibration signal with reference signals proportional to preselected alarm and trip levels.

The system automatically indicates, via the computer print-out, those channels which go into a trip condition within a preselected time span. That is, the time to failure is calculated and displayed via the print-out. Each channel's "look ahead" time may be selected with a user-programmable jumper board within the computer. Additionally, trend prediction for any individual channel or monitor may be manually requested at any time via front panel trend and channel selection switches.

The system also incorporates frequency spectrum analysis circuitry which provides frequency spectrum sampling of input vibration signals over a wide range of frequencies in 1/20 octave steps. Only those frequencies whose amplitudes are greater than 10% of full scale are listed on the paper tape computer print-out, along with the overall vibration level. Vibration analysis is performed automatically upon receipt of a trip or alarm signal, for a calculated trend alarm for any channel, or at preset intervals. The paper tape print-out indicates which channel has gone into a fault condition and what that condition was (i.e., trip, alarm or trend alarm) as well as a change in any channel's condition.

Figure 2:
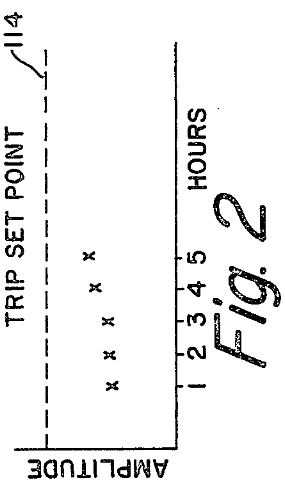
Figure 3:
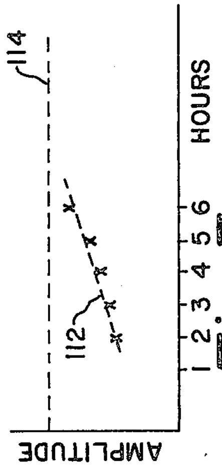
Figure 4:
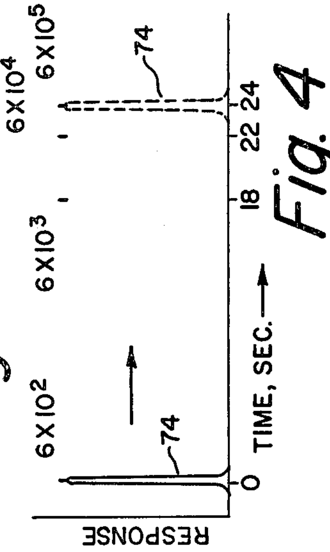
Figure 5:
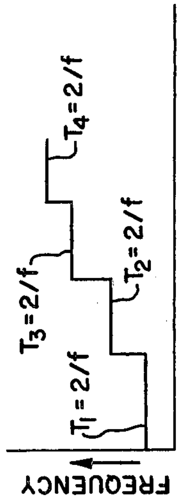
Figure 1B:
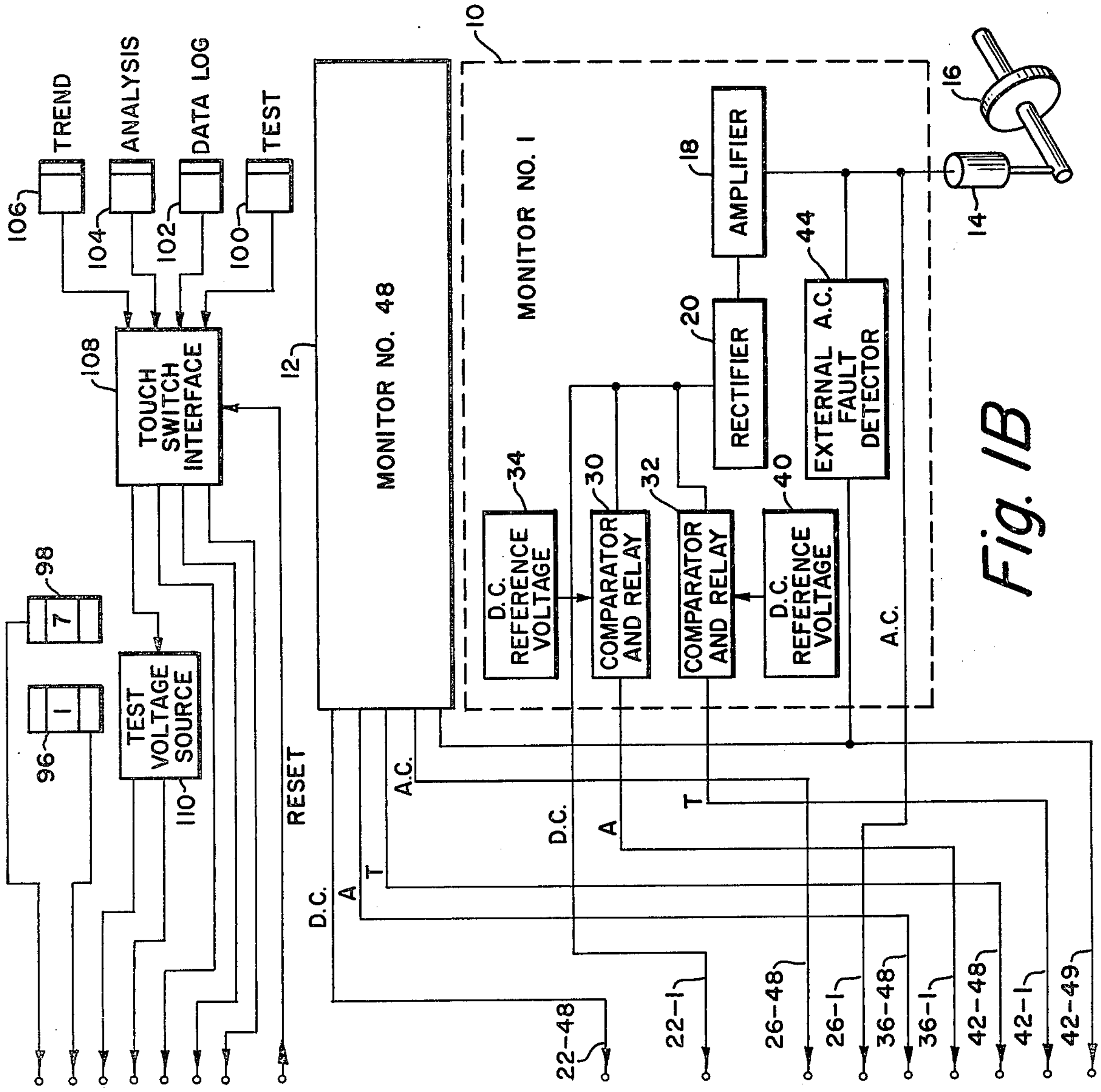

The above and other objects and features of the invention will become apparent from the following detailed description taken in connection with the accompanying drawings which form a part of this specification, and in which:

FIGS. 1A and 1B (hereinafter referred to together as "FIG. 1") comprise a schematic block diagram of the data acquisition system of the invention;

FIGS. 2 and 3 graphically illustrate the manner in which successive sampled vibration level signals are stored in the computer of the acquisition system and the manner in which a trend (i.e., time to failure) is determined; and FIGS. 4 and 5 graphically illustrate the operation of the voltage tuned filter utilized in the spectrum analyzer of the invention.

With reference now to the drawings, and particularly to FIG. 1, the data acquisition system shown includes forty-eight channels or monitors for monitoring a physical condition of a device to be monitored. Only monitor Nos. 1 and 48 are shown in the drawing and are identified by the reference numerals 10 and 12. It will be further assumed for purposes of explanation that the data acquisition system is to be used in a vibration monitoring system. Thus, each monitor, such as monitor 10, is connected to a vibration pickup 14 in contact with a bearing of a rotating member 16, for example, and adapted to produce either a displacement, velocity or acceleration vibration signal. Pickup 14 is connected through an amplifier 18 to a rectifier 20 which will produce an essentially steady-state direct current output signal on lead 22-1 which is applied to one input of a first multiplexer 24. Similarly, each of the other monitors will apply an input to the multiplexer 24, only the lead for the last monitor 48 being shown in the drawing and identified by the reference numeral 22-48.

The oscillatory vibration signal from the pickup 14 is also applied directly via lead 26-1 to a second multiplexer 28. The same is true of the remaining monitors, the oscillatory signal for the last monitor 12 being applied via lead 26-48 to multiplexer 28. Each of the monitors also incorporates first and second comparators and relays 30 and 32. In comparator 30, for example, the direct current signal from rectifier 20, representing the amplitude of the vibration signal, is compared with a direct current signal from D.C. reference voltage source 34. If the direct current signal from rectifier 20 equals or exceeds the magnitude of the signal from source 34, then a relay is actuated to produce a steady-state direct current signal on lead 36-1 connected to the input of a third multiplexer 38. The amplitude of the direct current signal from rectifier 20 at which the relay is closed to energize lead 36-1 is chosen arbitrarily and represents that amplitude of the vibration signal which signifies an alarm condition (i.e., an imminent malfunction). Similarly, the output of rectifier 20 is compared with a direct current signal from D.C. reference voltage source 40 in the comparator and relay 32, the arrangement being such that when the amplitude of the vibration signal reaches a point where the device being monitored should be shut down, the relay is actuated to energize lead 42-1. This trip signal on lead 42-1 is also applied to the third multiplexer 38. Even though the equipment in question may be shut down automatically upon receipt of a trip signal, ordinarily sufficient momentum of the rotating parts, for example, will keep the parts rotating for a sufficient period of time to permit a meaningful spectrum analysis and data log to be taken. Alarm and trip signals are also applied to the multiplexer 38 from each of the other forty-seven monitors, the alarm signal from monitor 12 being on lead 36-48 and the trip signal from monitor 12 being on lead 42-48.

Included in each monitor, such as monitor 10, is an external fault detector 44 adapted to detect faults such as a change in impedance due to breakage in the cable leading to the pickup 14 or an inaccurate gap for a non-contact vibration pickup such as that shown in U.S. Pat. No. 3,707,671. Whenever an external fault occurs, a signal is applied to the trip lead 42-49, common to all monitors, and applied to the multiplexer 38. As will be seen, in the particular embodiment of the invention shown herein, the occurrence of an external fault at any monitor causes a printer to print-out "SYSTEM ALARM" without identifying the channel from which the fault signal was derived. This must be derived by manual examination of each monitor.

A manual programmer 46, comprising an internal jumper board, allows manual selection of individual channel parameters such as trip level setpoint for trend prediction and full-scale range for each channel, along with appropriate units of measure such as mils, inches per second or G's. A selection of sixteen combinations of (i.e., four binary bits) full-scale range in engineering units is provided for each channel. These sixteen choices, specified by the user of the data acquisition system, are coded into the custom-programmed module or programmer 46 which forms part of the internal computer memory. The jumper board allows individual channel selection to any one of sixteen choices. In addition, functions common to all forty-eight channels may be selected on the jumper board 46, such as repetition rate of automatic data log print-out and "time until trip" setpoint of a trend alarm. Each of the inputs from the programmer 46 passes through a digital multiplexer 48 to a computer 50 along with the inputs from multiplexers 38 and 24.

The multiplexer 48 is controlled from the computer 50 by means of a nine-bit address input 52. Similarly, multiplexer 38 is controlled so as to select a particular input channel monitor via a seven-bit address input 54. Multiplexer 24 is controlled by a six-bit address input 56; however the output of the multiplexer 24 must pass through an analog-to-digital converter 58 before being fed into the digital computer 50 since the signals on leads 22-1 through 22-48 are direct current signals whose magnitudes are proportional to the magnitudes of the vibration signals being monitored. The multiplexer 28, to which the oscillatory vibration signals on leads 26-1 through 26-48 are applied, is also controlled by a six-bit address input 60. A strobe input is applied to each of the multiplexers 24 and 28 via leads 62; while an end of conversion signal from each of the analog-to-digital converters 58 and 84 is fed back into the computer via leads 64.

The oscillatory vibration signals at the output of the multiplexer 28 are applied to the novel spectrum analyzing apparatus of the invention, enclosed by broken lines in FIG. 1 and identified generally by the reference numeral 66. It comprises a single-double integrator 68 controlled by a signal from the computer 50. It is desired to perform a spectrum analysis on a vibration displacement signal. Hence, if the signal detected by any monitor is not a displacement signal but rather a velocity signal, a single integration is performed to convert it to a displacement signal. On the other hand, if the signal produced by a monitor is an acceleration signal, a double integration is performed to convert the acceleration signal to a displacement signal.

From the sixteen combinations selected by the manual programmer 46, it is known whether or not integration is required and the gain required for amplifier 70. For example, if channel No. 21 is programmed in mils (i.e., displacement), a single integration is required to convert a velocity signal in inches per second to mils. Additionally, the gain of amplifier 70 is adjusted to give a full-scale output for the particular vibration pickup used. For example, if a velocity pickup for channel No. 10 has an output of 764 millivolts RMS per inch per second peak, then the amplifier gain must be ten to achieve a 7.64 volt full scale output required for a peak detector 80 adapted to detect a peak voltage of 10 volts, as dictated by an analog-to-digital converter 84.

The output of the integrator 68 is coupled through the programmable gain amplifier 70 to the input of a voltage tuned filter 72 which has a passband which sweeps through the expected range of frequency components of an incoming vibration signal. The operation of the voltage tuned filter is schematically illustrated in FIGS. 4 and 5. The passband of the filter, indicated by the reference numeral 74 in FIG. 4 is caused to sweep through a frequency range of 600 cycles per minute to 600,000 cycles per minute. This sweep takes a total of twenty-four seconds. However, in order to obtain a good frequency sample, it is necessary to have the passband dwell at each frequency being sampled for at least 2 cycles of the selected frequency. The dwell times are shown in FIG. 5 and it will be noted that the dwell time for each frequency is 2 divided by the selected frequency. Thus, at the lowest frequency of 600 cycles per minute (10 cps), the dwell time is about 1/5 of a second. The dwell time for each successive step decreases until, at a frequency of 6000 cycles per minute, for example, it is 1/50th of a second. The time to sweep through the band of frequencies from 600 to 6000 cycles per minute, as shown in FIG. 4, is about eighteen seconds; however the time required to sweep through the band between 6000 and 60,000 cycles per minute is only four seconds; and the time to sweep through 60,000 cycles per minute to 600,000 cycles per minute is only about two seconds.

The manner in which the passband sweeps through the spectrum is controlled via address inputs or bits on lead 76 from the computer 50 applied to the voltage tuned filter 72 through a digital-to-analog converter 78. Signals passing through the voltage tuned filter are applied to the peak detector 80, the arrangement being such that only those frequencies whose amplitudes are greater than 10% of the full-scale value as determined by the internal computer program will be listed in the computer print-out. The peak detector 80 is reset by signal on lead 82 from the computer prior to each frequency sample derived from the voltage tuned filter 72. From the peak detector 80, the signal passes through the analog-to-digital converter 84 to the computer 50. The computer 50 includes the usual input-output interface 86 connected to a central processing unit 88, the central processing unit 88 being controlled by a read-only memory comprising the computer program 90 and a random access memory 92. The input-output interface is also connected to a printer 94.

In addition to automatic functions, it is also possible to manually obtain data from any monitor or channel by means of touch switches 96 and 98. In the illustration given in FIG. 1, for example, the switches 96 and 98 have been adjusted to receive information from channel 17. After the channel is selected, a system test can be achieved by depressing touch switch 100. Similarly, a data log can be achieved by depressing touch switch 102 and a spectrum analysis can be achieved by depressing switch 104. Finally, a trend analysis can be achieved from any monitor by depressing touch switch 106, these switches being connected through a touch switch interface 108 to the computer 50. When touch switch 100 is depressed, a test voltage source 110, for example, will apply test voltages to two selected channels.

A flow diagram of the computer program utilized with the invention is as follows:

DECLARE ALL VOLTAGES
TO BE READ INTO STORAGE
↓
CONSTRUCT TABLE OF
FREQUENCIES TO BE
PRINTED OUT (Read-only memory)
↓
CONSTRUCT TABLE OF
TUNING VOLTAGES FOR
VOLTAGE TUNED FILTER
67 tenth-octave filters (Read-only memory)
↓
ACTIVATE DC
MULTIPLEXING (MULTIPLEXER 24)
↓
READ INTERNAL
CLOCK - HOURS
& CALCULATE DAYS through 365
↓
SELECT CHANNEL #FOR MANUAL
ANALYSIS AND TREND
↓
TEST ALARM STATUS
↓
ACTIVATE DIGITAL
MULTIPLEXERS 38 and 48
↓
ACTIVATE STATUS FILE
↓
ESTABLISH TREND
ALARM (same time for all channels)
↓
READ IN FULL SCALE
& ENGINEERING UNITS
↓
ESTABLISH DATA LOG
SCHEDULE PRINT-OUT
↓
ESTABLISH AUTO DATA
LOG PRINT-OUT
ESTABLISH AUTO
ANALYSIS PRINT-OUT
↓
SCALING FACTOR FOR
FULL SCALE
MANUAL DATA LOG
INPUT COMMAND
↓
MANUAL TREND
↓
MANUAL ANALYSIS
↓
CALCULATE TREND
FOR ALL CHANNELS
& STORAGE WITH last
5 Hourly Readings -continued ↓
COMPARE WITH
ESTABLISHED TREND
ALARM
↓
ANALYSIS PRINT-OUT
↓
DATA LOG PRINT-OUT
↓
TREND ALARM PRINT-OUT
↓
SYSTEM ALARM PRINT-OUT The first step in the program is to declare all variables to be read into the random access memory 92 and their location in storage. This includes direct current amplitude signals from multiplexer 24, the signals from manual programmer 46, and the trip and alarm signals from multiplexer 38. A table of frequencies to be printed out in each spectrum analysis is then constructed from data permanently stored in the read-only memory 90. This table is the same for all channels; however only those frequencies will be printed out which exceed 10% of full scale in amplitude. The next step in the program is to construct a table of tuning voltages derived from the read-only memory 90 for the voltage tuned filter 72, this corresponding to the table of frequencies to be printed out. Direct current multiplexing by multiplexer 24 is then activated; whereupon each of the direct current amplitude signals from the multiplexer 24 is sampled in succession. This is followed by a reading of the internal clock in hours and days, the days being calculated from accumulated hours. The internal clock is capable of indicating the day of the year from 1 through 365 as well as time of day up to 24 hours.

The following step in the program is to select a channel for manual frequency analysis or trend analysis. In this phase, the central processing unit 88, activated by touch switches 96 and 98, is conditioned to receive signals from a single channel to perform a spectrum analysis upon depression of touch switch 104 or a trend print-out upon depression of touch switch 106. Thereafter, a test alarm status is performed by momentarily altering internal test voltages. The print-out will indicate system alarm and system normal as test voltages are altered, then returned to normal. This step insures that the internal computer circuitry is operating properly. The digital multiplexers 38 and 48 are then activated to read-in alarm and trip signals as well as information from the manual programmer 46. A status file is then activated to store normal, alarm and trip signals and to determine whether there has been a change in an alarm, trip or normal signal. Following this, the trend alarm is established, which is the time to failure (i.e., trip) of a particular unit being monitored. Generally, this time will be the same for all channels.

The next step in the program is to read in full-scale units for each monitor and the engineering units from the manual programmer 46. This determines: (1) the time period between scheduled automatic data log print-outs (i.e., one hour, eight hours, etc.); (2) data log print-out upon receipt of a trip, alarm or trend alarm signal; and (3) automatic spectrum analysis print-out upon receipt of a trend alarm, a trip signal, or an alarm signal. A scaling factor for full scale is then entered which corrects the stored overall value for full-scale readings. This is followed by the manual data log, manual trend and manual analysis input commands. At this time, the conditions of switches 100–106 are examined by the central processing unit 88 to determine if a manually-activated print-out has been commanded. The alarm trend for all channels is then computed and stored with the last four hourly-readings of vibration level from multiplexer 24.

FIGS. 2 and 3 illustrate the manner in which the trend alarm is calculated. From FIG. 2, it can be seen that the vibration amplitude from a particular monitor has risen over five successive hours. At the 6th hour, the signal received at the first hour is removed from storage and the 6th-hour signal is inserted. However, before the first-hour signal is removed, it is averaged with the first through fifth-hour signals. Likewise, the second through sixth-hour signals are averaged. From these two averages, the computer establishes, in effect, a straight line 112 and calculates the slope of that line. Whether or not an alarm trend signal will be generated is achieved by calculating, through a simple trigonometric relationship, the time between the last average point and an intersection of line 112 with an established trip setpoint 114. If the calculated time is equal to or less than a predetermined time stored in the random access memory 92 (which is the same for all channels), then automatic input-output occurs for the channel in question as well as a vibration analysis for that channel and a data log on all monitors associated with a piece of equipment from which the trend alarm was signaled. The final steps in the program comprise analysis print-out, data log print-out, trend alarm print-out and system alarm print-out, in which steps the printer is commanded to print-out data stored in the random access memory 92.

Typical print-outs from the printer 94 under certain conditions are as follows:

| CONDITION | | PRINT-OUT |
|---|---|---|
| Normal Periodic Data | Data Log | 1ϕ17 ϕ25 |
| Log or On Command | ϕ1 | ϕ.15 G |
| Via Touch Switch | ϕ2 | ϕ.10 G |
| | ϕ3 | ϕ.81 MIL |
| | ϕ4 | ϕ.07 I/S |
| | ϕ5 | ϕ.18 MIL |
| | 47 | ϕ.25 MIL |
| | 48 | ϕ.30 MIL |
| Spectrum Analysis | Analysis | 2ϕ31 ϕ9ϕ CH21 |
| on Command Via | Overall | ϕ.8 1 MIL |
| Touch Switch | 1476 | ϕ.1 2 --- |
| | 1582 | ϕ.1 9 ---- |
| | 1696 | ϕ.4 3 ---------- |
| | 1817 | ϕ.3 9 --------- |
| | 1946 | ϕ.1 6 ---- |
| | 3163 | ϕ.2 2 ----- |
| | 3391 | ϕ.2 8 ------- |
| | 3634 | 100 .1 8 ---- |
| | 4171 | ϕ.1 ϕ -- |
| | 48ϕϕ | ϕ.1 ϕ -- |
| | 5146 | ϕ.1 1 -- |
| | 689ϕ | ϕ.1 2 --- |
| Trend on Command | TREND ALARM 1ϕ12 ϕ95 CH15 | |
| via Touch Switch | INF HOURS TO TRIP | |
| Automatic Vibration | Analysis | ϕ1ϕ7 31ϕCH11 |
| Analysis & Data Log | Overall | ϕ9.3 MIL |
| Upon Receipt of | 1378 | ϕ2.5 MIL ------ |
| Alarm or Trip Signal | 1582 | ϕ1.7 MIL ---- |
| | 1817 | ϕ4.6 MIL ----------- |
| | 6430 | ϕ4.1 MIL ---------- |
| | DATA LOG | |
| | ϕ3 5.ϕϕ MIL A*TD | |
| | ϕ4 .07 I/S | |
| | ϕ11 1.ϕϕI/S T*TD | |
| | ϕ24 ϕ.78 MIL | |
| | ϕ25 6.22 MIL A* | |
| SYSTEM TEST | SYSTEM ALARM ϕ815 225 | |
| | | SYSTEM NORMAL ϕ816 225 |

The first print-out above is normal periodic data log or a data log which can be on command via the touch switch 102. The number 1017 indicates that the print-out occurred at the 10th hour and 17th minute of the day in question; and the number 025 indicates that the print-out occurred on the 25th day of the year. The condition of each channel is printed out beneath the date and time. For example, channel No. 1 prints out 0.15 G's. The arithmetic unit involved for this particular channel was determined by the manual programmer 46 as are the arithmetic units for all of the other channels. Channel No. 3, for example, prints out 0.81 MILS whereas channel No. 4 prints out 0.07 inch per second and represents a signal derived from an accelerometer pickup.

The next print-out represents a spectrum analysis for a particular channel on command via the touch switch 104 of FIG. 1. The print-out shows that the analysis occurred at the 20th hour and 31st minute of the 90th day of the year and is for channel No. 21, this being determined by the touch switches 96 and 98 in FIG. 1. The print-out shows that the overall signal level (i.e., for all frequencies) is 0.81 MIL. Following this is a print-out of the specific amplitudes at various predetermined frequencies which are initially determined in the manual programmer 46. In the example shown, samples are taken at 1476, 1582, 1696, etc. cycles per minute. From this analysis, and from previous experience with the vibrating equipment in question, the general condition of the equipment can be determined. For example, excessive amplitude at one frequency can indicate a lubrication problem. The tips of the dashed lines to the right of the amplitude readings give an approximte visual representation or plot of the spectral response of the input signal. Each dash represents a full 0.04 mil amplitude such that the line for 0.43 mils, for example, contains 10 dashes, that for 0.39 mils contains 9 dashes, etc.

The next two print-outs in the foregoing example are trend on command via the touch switch 106 of FIG. 1 and an automatic trend alarm. In the trend on command, the print-out indicates that for channel 15, preselected via the switches 96 and 98, there are an infinite number of hours to trip at 10:12 A.M. on the 95th day of the year and that the equipment being monitored is operating satisfactorily. The next print-out is an automatic vibration analysis and data log upon receipt of an alarm or trip signal from any monitor. This automatic analysis occurred on the 310th day of the year at 1:07 A.M. for channel 11. Following the print-out of the vibration analysis at preselected frequencies is a data log for only those monitors associated with the equipment from which the alarm or trip signal was received on channel 11. These comprise monitors 3, 4, 11, 24 and 25 preselected in the manual programmer 46. The "T" for channel 11 shows that this channel went into a trip condition and the "A" for channel 3 shows that this channel went into an alarm condition. The "TD" signifies that both channels 3 and 11 are in a trend alarm condition also. The asterisk indicates a change in that channel's condition. When the fault condition is reset, an automatic data log will follow, with only the asterisk present (i.e., without the "T", "A" or "TD" designations).

Finally, a system test print-out occurs when touch switch 100 is depressed. As was explained above, the system test provides for checking of internal circuit faults sensing by momentarily altering the internal test voltages via the touch switch 100. The print-out indicates system alarm and system normal as test voltages are altered, then returned to normal. An automatic system alarm occurs when an external monitor system circuit fault relay is energized while a system normal will result when the external relay is released. Also, an automatic system alarm occurs if a malfunction in the data acquisition system is detected. A system normal will result when the malfunction is corrected.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a data acquisition system, the combination of a plurality of monitoring devices each adapted to produce an electrical signal indicative of a physical condition of apparatus to be monitored, computer apparatus including memory means and print-out means, multiplexing means for feeding each of said signals from the respective monitoring devices to said computer apparatus, means for periodically storing at least selected ones of said electrical signals from each monitoring device in said memory means, means in said computer apparatus for computing from the trend of a characteristic of the stored electrical signals from each monitoring device the probable time to failure of the monitored apparatus from which those signals were derived, and means responsive to said determining means for causing said print-out means to print indicia indicative of the probable time to failure.

2. The system of claim 1 wherein the oldest stored signal is removed from the memory means each time a new selected signal is fed into said memory means.

3. The system of claim 1 including means for sensing an alarm condition of a signal from each monitor indicating a probable malfunction of the apparatus being monitored and for producing a steady-state alarm signal, means for sensing a trip condition of a signal from each monitor and for producing a steady-state trip signal indicating that the apparatus being monitored should be shut down, multiplexing means for feeding all of said alarm and trip signals to said computer means, and apparatus within said computer means for actuating the print-out means to print the existence of an alarm or trip signal and an identification of the monitor from which it was derived.

4. The system of claim 1 wherein said electrical signals indicative of a physical condition comprise vibration signals, and including means for performing a spectrum analysis on a vibration signal from a monitor.

5. The system of claim 4 including means for actuating said print-out means to print selected ones of the frequencies in said vibration signal and the amplitudes of said selected frequencies.

6. The system of claim 4 wherein said means for performing a spectrum analysis includes a voltage tuned filter which samples selected ones of the frequencies in the vibration signal.

7. The system of claim 1 including means in said computer means for causing said print-out means to print the status of each electrical signal indicative of a physical condition and an identification of the monitor from which each signal was derived.

8. A vibration analyzing monitoring system comprising a plurality of vibration pickups each adapted to produce an oscillatory electrical vibration signal derived from a device being monitored, monitor devices incorporating rectifiers for producing direct current signals proportional to the amplitudes of the vibration signals, computer apparatus including memory means and print-out means, an analog-to-digital converter and a multiplexer for feeding into said computer apparatus a succession of digital signals representing the amplitudes of the direct current signals, means for periodically storing at least selected ones of the digital signals from each monitor device in said memory means, apparatus in said computer apparatus for computing from a plurality of stored digital signals which are increasing in magnitude the probable time to failure of a vibrating device from which said stored signals were derived, and means in said computer apparatus for actuating said print-out means to print-out the time to failure thus computed.

9. The monitoring system of claim 8 including means for storing in said memory means a condition of the computed time to failure for each monitor at which a trend alarm should be signaled, and means for automatically actuating said print-out means to print the time to failure whenever said stored condition is exceeded.

10. The monitoring system of claim 8 including means for automatically actuating said print-out means periodically to print the magnitude of the stored signals representing vibration amplitude from each monitor device.

11. The monitoring system of claim 8 including means for sensing an alarm condition of a signal from each monitor indicating a probable malfunction of the apparatus being monitored and for producing a steady-state signal, means for sensing a trip condition of a signal from each monitor and for producing a steady-state trip signal indicating that the apparatus being monitored should be shut down, multiplexing means for feeding all of said alarm and trip signals to said computer, and apparatus within said computer apparatus for actuating the print-out means to print the magnitude of the stored signals representing vibration amplitude for each monitor and an identification of the monitor from which each stored signal was derived.

12. The monitoring system of claim 8 including means for performing a spectrum analysis on a vibration signal from a monitor whenever that monitor generates an alarm or trip signal.

13. The monitoring system of claim 8 including means for manually actuating said print-out means to print the magnitude of the vibration signal from any monitor, or the trend in variation of the magnitude of the vibration signal from any monitor.

14. In vibration analyzing apparatus, the combination of means for producing an electrical oscillatory signal having frequency components corresponding to those found in vibrations produced by a vibrating element, a filter having a variable passband and capable of sampling said oscillatory signal over a frequency range, means for applying said oscillatory signal to the input of said filter, means for causing said passband to sweep through said frequency range in steps to produce sample signals at different frequencies, the passband stopping during each step in an amount at least equal to 2 divided by the frequency being sampled, a peak detector coupled to the output of said filter for generating output signals only when the sampled frequencies exceed a predetermined amplitude, and means for recording those frequencies detected by the peak detector.

15. The vibration analyzing apparatus of claim 14 including means for recording the maximum amplitude of the vibration signal for each recorded frequency.

16. In a data acquisition system, the combination of a plurality of monitoring devices each adapted to produce an electrical signal indicative of a physical condition of apparatus to be monitored, computer apparatus including memory means and print-out means, multiplexing means for feeding each of said signals from the respective monitoring devices to the computer apparatus, means for periodically storing selected ones of said electrical signals from each monitoring device in said memory means, means for sensing an off-normal condition of a signal from each monitoring device and for producing steady-state signals indicative of the off-normal condition, said steady-state off-normal signals comprising alarm signals indicating a probable malfunction of apparatus being monitored and trip signals indicating that the apparatus being monitored should be shut down, multiplexing means for feeding all of said steady-state signals to said computer apparatus, and means in the computer apparatus for actuating the print-out means to print the values of said stored signals as well as the existence of a steady-state off-normal signal and an indication of whether the off-normal signal is an alarm or trip signal.

17. A vibration analyzing monitoring system comprising a plurality of vibration pickups each adapted to produce an oscillatory electrical vibration signal derived from a device being monitored, monitor means for producing signals proportional to the amplitudes of the vibration signals, computer apparatus including memory means and print-out means, means for feeding into said computer apparatus a succession of signals representing the amplitudes of the vibration signals, means for periodically storing at least selected ones of the signals from each monitor device in said memory means, apparatus in said computer apparatus for computing from a plurality of stored signals derived from monitor devices which are increasing in magnitude the probable time to failure of a vibrating device from which said stored signals were derived, and means in said computer apparatus for actuating said print-out means to print the time to failure thus computed.

18. In a data acquisition system, the combination of a plurality of monitoring devices each adapted to produce an electrical signal indicative of a physical condition of apparatus to be monitored, computer apparatus including memory means and print-out means, multiplexing means for feeding each of said signals from the respective monitoring devices to said computer apparatus, means for periodically storing at least selected ones of said electrical signals from each monitoring device in said memory means, apparatus in said computer means for computing from the trend of a characteristic of the stored electrical signals from each monitoring device the probable time to failure of the monitored apparatus from which those signals were derived, means responsive to said determining means for causing said print-out means to print indicia indicative of the probable time to failure, means for actuating said print-out means to print an indication of a trip or alarm condition detected by any monitor, and means for automatically actuating said print-out means to print the magnitude of the stored signals representing vibration amplitudes for selected ones of said monitors whenever a trend or alarm condition occurs.

19. In vibration analyzing apparatus, the combination of a plurality of monitors each adapted to produce an electrical oscillatory signal having frequency components corresponding to those found in vibrations produced by a vibrating element, spectrum analyzing apparatus incorporating means for performing, alternatively, a single integration or a double integration on an incoming signal, means for applying the oscillatory signals from each monitor in succession to said spectrum analyzing means, means for actuating said spectrum analyzing means to perform a single integration on an incoming signal when the oscillatory signal from a monitor applied thereto is a velocity signal, and means for actuating said spectrum analyzing means to perform a double integration on an incoming signal when said incoming oscillatory signal from a monitor is an acceleration signal.

20. In a data acquisition system, the combination of a plurality of monitoring devices each adapted to produce an electrical signal indicative of a physical condition of apparatus to be monitored, computer apparatus including memory means and data indicating means, means for feeding each of said signals from the respective monitoring devices to said computer apparatus, means for periodically storing at least selected ones of said electrical signals from each monitoring device in said memory means, means in said computer apparatus for computing from the trend of a characteristic of the stored electrical signals from each monitoring device the probable time to failure of the monitored apparatus from which those signals were derived, and means responsive to said determining means for causing said indicating means to produce indicia indicative of the probable time to failure.

* * * * *